H. HESS.
ROLL FILM OR SIMILAR CAMERA FOR COLOR PHOTOGRAPHY.
APPLICATION FILED AUG. 27, 1917.
1,330,535.
Patented Feb. 10, 1920.
2 SHEETS—SHEET 2.
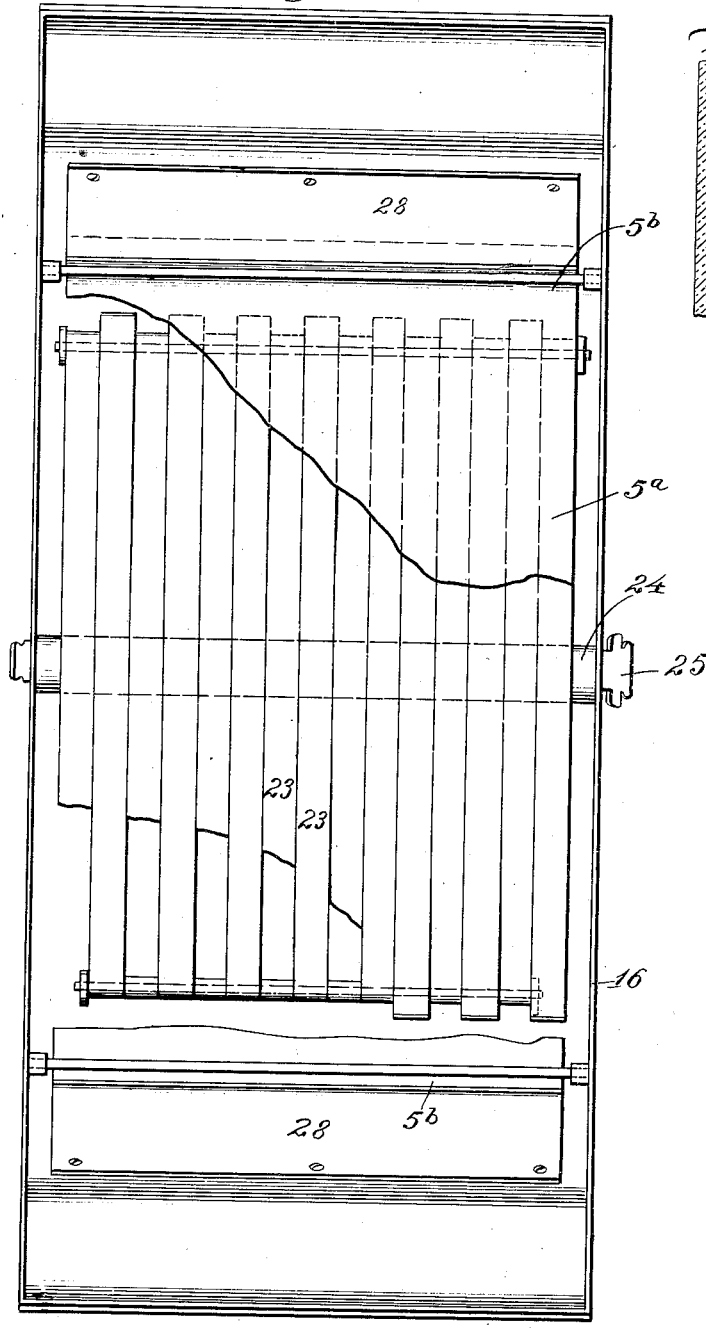
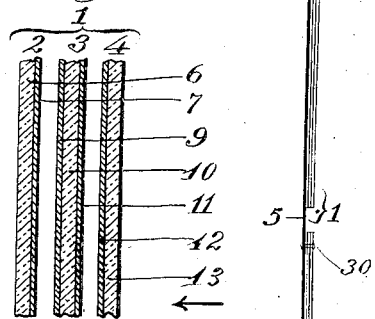
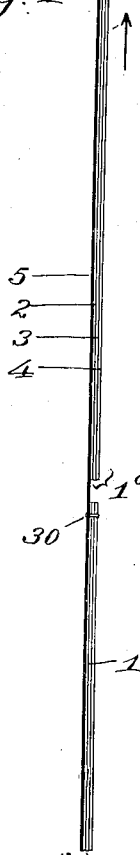

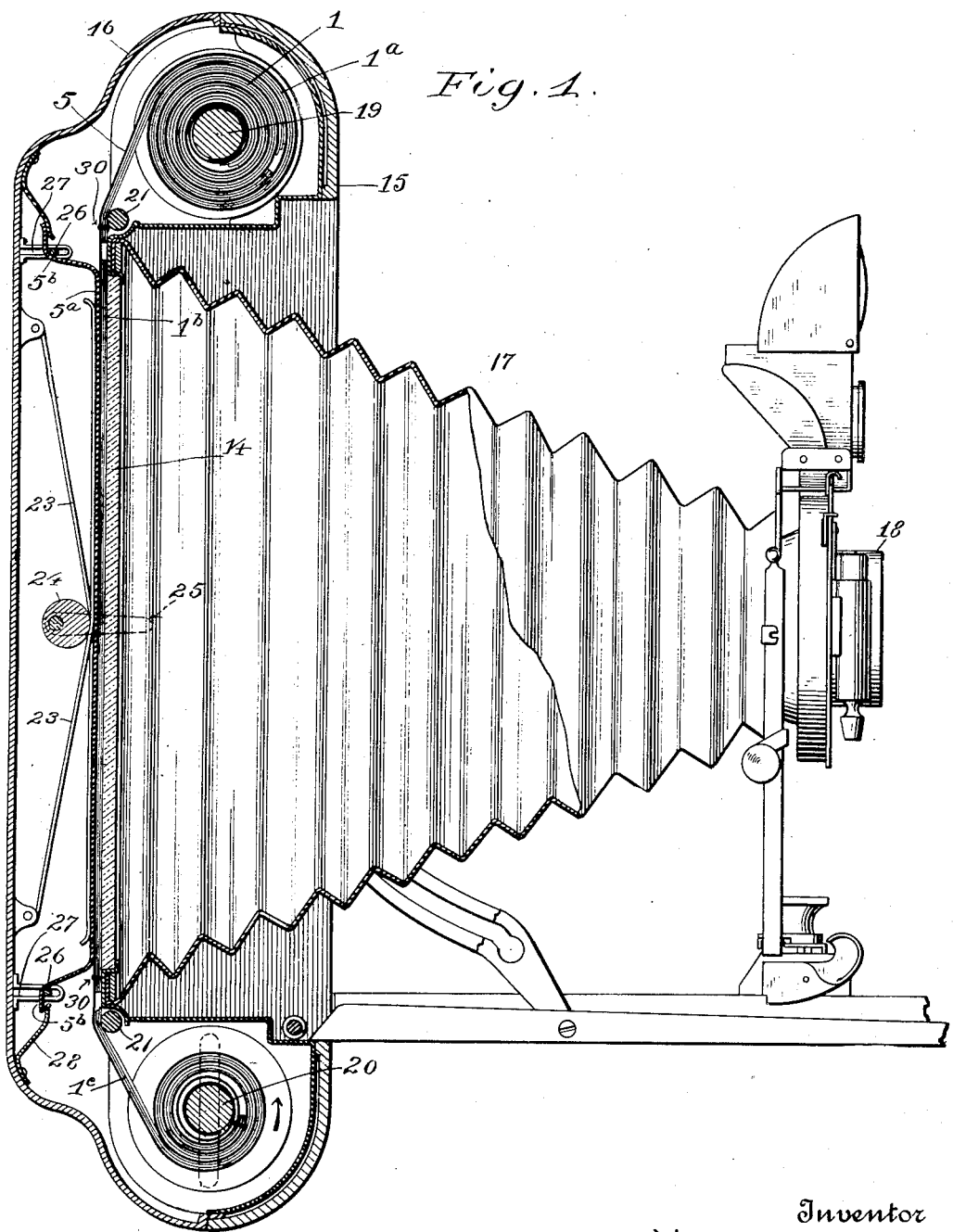

UNITED STATES PATENT OFFICE.

HENRY HESS, OF PHILADELPHIA, PENNSYLVANIA, ASSIGNOR TO HESS-IVES CORPORATION, OF PHILADELPHIA, PENNSYLVANIA, A CORPORATION OF VIRGINIA.

ROLL-FILM OR SIMILAR CAMERA FOR COLOR PHOTOGRAPHY.

1,330,535.     Specification of Letters Patent.    Patented Feb. 10, 1920.

Application filed August 27, 1917. Serial No. 188,317.

*To all whom it may concern:*

Be it known that I, HENRY HESS, a citizen of the United States, residing at Philadelphia, in the county of Philadelphia and State of Pennsylvania, have invented certain new and useful Improvements in Roll-Film or Similar Cameras for Color Photography, of which the following is a specification, reference being had therein to the accompanying drawing.

This invention relates to photographic apparatus, and more especially to cameras or camera parts adapted to be used in practising the art of color photography, although the invention might be useful in other cases where a plurality of sensitive members in superposition are to be simultaneously exposed. An example of the plan for taking color photographs by simultaneous exposure of the three or other number of superposed color sensitized plates is the film pack of F. E. Ives, illustrated in his Patents Nos. 927,244 of July 6, 1909, and 1,173,429 of February 29, 1916, wherein the assemblage is bound into a rigid pack having a rigid glass front and a rigid rear member, and being handled as an entirety adapted to be inserted into and removed from an ordinary camera plate-holder.

The improvement constituting the present invention is more particularly of use in enabling such plurality of members to be simultaneously exposed in the so-called roll film camera. By this invention successive color photography exposures may be made without the need of reloading or change of plate-holders.

The object of the present invention is to secure the above-mentioned results, and generally speaking this is done by means of a flexible assemblage of the two or more color sensitized films in superposed relation, which assemblage without removal from the camera is adapted to be shifted from the exposing position and to be replaced successively by other similar assemblages. The present invention secures this object in a practical manner affording all the conveniences of the roll film type of camera while securing to perfection the practice of the system of color photography wherein a plurality of superposed sensitized films are simultaneously exposed.

In the accompanying drawings forming a part hereof, Figure 1 is a side elevation, partly in central longitudinal cross section, of a camera of the roll film type reconstructed so as to constitute an embodiment of the principles of the present invention.

Fig. 2 is a front view of the removable camera back detached from the camera.

Fig. 3 is a detailed cross section on a magnified scale of the film assemblage showing one convenient manner of building up the flexible multiple film.

Fig. 4 shows in detail the form of the film and flexible sensitized components, on a lesser scale.

One of the important constructive features is the reconstruction of the apparatus to contain a permanent and rigid glass plate located in the apparatus directly in front of the focal plane so that the flexible film assemblage may be caused to bear snugly and flatly against the glass, in combination with suitable pressure springs or resilient means to the rear of the glass adapted to press the flexible film assemblages snugly and flatly against the glass during the period of exposure; such combination so constructed as to permit each set or group of exposed film or film portions to be shifted from the exposing position, and the replacement thereof by the successive film assemblages or film groups to be exposed.

I will first describe the nature of the components, and the make-up of the film group preferred to be used in the present invention. The successive groups are marked 1, $1^a$, $1^b$, etc.

The film group 1 as a whole may consist of a plurality of differently sensitized components such as the red-sensitive component 2, the green-sensitive component 3 and the blue-sensitive component 4 arranged, for example, in the order mentioned with the last mentioned component at the front or nearest the camera lens, see Figs. 1, 3 and 4.

With these sensitive components may be combined an opaque or protective back 5 which may be flexible, being composed of paper in Fig. 1, so as to be shifted with the flexible films.

Referring to the construction of the respective components, the component 2 may consist of a celluloid carrier 6 carrying a red-sensitive coating 7. The component 3 may consist of a green-sensitive coating 9 carried on a celluloid carrier 10 having a colloid protecting surface 11. The blue-sensitive coating 12 is formed on a celluloid carrier 13. It will be noticed that the red and green-sensitive members face each other, and that the blue-sensitive member faces rearwardly. All of the sensitive coatings will be brought in very close proximity since the dimensions are very small, being extremely exaggerated in the figures. There may be color selective screens comprised in the film group in a manner proposed in said prior patents.

It will be seen that the film group 1, described, is of flexible nature and would be susceptible to curvature or buckling unless suitably held during exposure. There is shown in Fig. 1, as a permanent part of the camera and directly in front of the film group, a sheet of plate glass 14, the flexible film being drawn or shifted along to the rear of this glass between exposures, and the film being resiliently but firmly pressed against the glass during exposure.

To secure such resilient pressure, a metal presser member 5ª is shown forming a permanent part of the camera and located directly to the rear of the flexible paper backing 5 already mentioned. This metal presser plate 5ª has flanges 5ᵇ by which it is held and guided in its pressing and yielding movements.

The plate glass at the front and the resilient presser at the rear of the film group to be exposed may be variously constructed and may be embodied in photographic apparatus in various modes. For example, as shown in Fig. 1, the camera or body 15 is shown as having a removable back 16; the former carries the plate glass, the latter the resilient presser.

The camera is provided with the usual bellows 17 and lens 18 and, if of the roll film type, is constructed to accommodate an upper film spool 19 containing a supply of film, and a lower film spool 20 for receiving the exposed film. Guide rollers 21, 21 are shown, over which the flexible film passes between the spools and exposing position.

Obviously, there may be an indefinitely long flexible three-part film which may be divided into longitudinal sections, each section constituting a film group for exposure and subsequent development in order to secure the color-selection negatives requisite in the Ives system of color photography.

The plate glass 14 may be secured in the camera body by obvious metallic means unnecessary to be described in detail.

The presser plate 5ª may be caused to resiliently bear against each successive film group by means of a spring or plurality of springs 23. A considerable number of these are shown in alternate relation, some pressing against the upper and some against the lower part of the plate 5ª. During exposure the springs are held under elastic flexure, and for this purpose an eccentric or similar device 24 may be employed having an exterior handle 25 by which the resilient pressure may be applied or removed. By this arrangement the pressure may be relaxed while winding the film from one spool to the other and reinstated during exposure.

In order to permit slight yielding movements of the pressure plate 5ª, its flanges 5ᵇ are shown as bent around transverse guide wires 26 which have suitable play within slotted guide members 27. Light sheet metal members 28 are arranged to overlap the flanges 5ᵇ serving as stops preventing excessive forward movement of the presser plate.

With this apparatus it will be understood that each section or film group 1 of the flexible three-part film is brought in turn into the exposing position shown, whereupon the handle 25 is manipulated to give a forcible spring pressure so as to press the film group flatly against the plate glass, whereupon the exposure will be made, this giving a color-selective actinic effect upon the three components 2, 3 and 4, after which the spring pressure may be relaxed and the receiving spool 20 turned in a well known manner to draw further film from the supply spool 19 in preparation for another exposure.

It will be observed in Fig. 1 that in the portions of the film that are wound on the spool the frontmost or innermost component has a tendency to a slight relative sliding longitudinally, but as my invention is constructed no buckling or other harm can come from this action because each assemblage of the three components is a unit and independent of the preceding and succeeding assemblages except in that all of the assemblages are attached together in endwise succession, preferably by their attachment to the elongated common carrier 5.

Each film assemblage may be secured to the carrier by a transverse row of stitching 30 at its forward edge, and the opposite edge will be left unattached so as to permit the relative movement of the members during their winding or unwinding. In this way in effect we have a rotary mechanism which by a train of successive film groups may be passed in the proper order into and out of exposing position.

It will be seen that the opaque backing or strip 5 constitutes an elongated flexible carrier for the procession of film groups 1, 1ª, 1ᵇ, etc., and that such film groups are secured by transverse securing means or stitches 30 at intervals along the carrier. The successive groups are preferably separate, as shown, and are carried by or secured to the carrier 5 along only one edge. Each group consists of a plurality of face to face sensitive members which are mutually connected to each other and to the carrier, and this line of connection or stitching is preferably the foremost edge, so that the successive film groups may be longitudinally spaced apart sufficiently to permit relative sliding of the members over each other during the winding, unwinding and rewinding.

It will thus be seen that I have described photographic apparatus including the sensitive elements, the same embodying the principles of the present invention; but, since the illustrated embodiment may be indefinitely varied in form, construction, combination, arrangement, detail and other features without departing from the underlying principles, I do not limit myself to such features except in so far as set forth in the appended claims.

What is claimed is:

1. A color-photography camera for successively exposing a connected train of multiple film groups, each group comprising a flexible front film member facing flexible rear film members and differently color-sensitized, the said camera including a rigid transparent plate located in the camera with its rear face in position to bring the sensitive layers into proper position with respect to the focal plane, means for drawing the train of film groups through the exposing position behind the rigid transparent plate, and a presser behind the exposing position adapted to press the several film members compactly into intimate face contact at the focal plane, said presser comprising a plate and interlacing sets of flat springs arranged to exert pressure over the plate's area, and a device for increasing and relaxing the pressure.

2. A color-photography camera for successively exposing a connected train of multiple film groups, each group comprising a flexible front film member facing flexible rear film members and differently color-sensitized, the said camera including a rigid transparent plate located in the camera with its rear face in position to bring the sensitive layers into the focal plane, means for drawing the train of film groups through the exposing position behind the rigid transparent plate, and a pressure applying means behind the exposing position of sufficient strength to press the several film members compactly into intimate face contact at the focal plane, said pressure applying means consisting of a plate, springs behind the plate pressing the same forwardly, and a device for relaxing the pressure of said springs.

3. A color-photography camera for successively exposing a connected train of multiple film groups, each group comprising a flexible front film member facing flexible rear film members and differently color-sensitized, the said camera including a rigid transparent plate held in the body of the camera with its rear face in position to bring the sensitive layers into the focal plane, means for drawing the train of film groups through the exposing position behind the rigid transparent plate, a detachable back separable from the body of the camera, said drawing means being mounted on the body, and a presser mounted on the detachable back behind the exposing position adapted to press the several film members compactly into intimate face contact at the focal plane, said pressure consisting of a thin plate, spring means behind the plate arranged to exert pressure over its area, and a device for relaxing such pressure.

In testimony whereof I have affixed my signature hereto.

HENRY HESS.